United States Patent
D'Annunzio et al.

(10) Patent No.: US 6,347,590 B1
(45) Date of Patent: Feb. 19, 2002

(54) CENTER CONSOLE STORED EXTENSIBLE TRAY TABLE

(75) Inventors: Gary D'Annunzio, Macomb Township; Todd A. Mysliwiec, Allen Park; Patrick M. Murray, Southfield; Jason P. Baldas, Warren; Jeff A. Kempf, Romeo; Frank Olson, Ortonville, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/514,459

(22) Filed: Feb. 28, 2000

Related U.S. Application Data

(60) Provisional application No. 60/121,993, filed on Feb. 27, 1999.

(51) Int. Cl.$^7$ .................................................. A47B 3/00
(52) U.S. Cl. .................... 108/44; 297/145; 297/188.15; 312/235.2; 108/25
(58) Field of Search ............................ 108/18, 25, 26, 108/35, 47, 134, 44; 312/235.2; 297/135, 188.01, 188.02, 188.11, 188.14, 188.15, 188.21, 145

(56) References Cited

U.S. PATENT DOCUMENTS

| | | | | | |
|---|---|---|---|---|---|
| 1,803,947 | A | * | 5/1931 | Runkles et al. | 297/188.14 X |
| 3,575,466 | A | * | 4/1971 | Thomas | 297/165 X |
| 3,632,161 | A | * | 1/1972 | Arfaras | 297/188.14 X |
| 4,834,449 | A | * | 5/1989 | Engleman | 108/134 X |
| 5,516,191 | A | * | 5/1996 | McKee | 297/199.15 |
| 5,542,360 | A | * | 8/1996 | Fleming | 108/26 X |
| 5,588,697 | A | * | 12/1996 | Yoshida et al. | 108/47 X |

* cited by examiner

*Primary Examiner*—Jose V. Chen
*Assistant Examiner*—Michael J. Fisher
(74) *Attorney, Agent, or Firm*—Brooks & Kushman P.C.

(57) ABSTRACT

A tray table for a vehicle that is extensible from and may be stored in a center console. The center console has longitudinally shiftable lateral side walls that define a pocket for storing the tray table. The lateral walls of the center console are moveable along a track to permit fore and aft adjustment of the location of the table relative to a seat in the vehicle. A push button is provided on a pivot locking mechanism to lock and unlock a tray support arm. A cup holder may be provided on the tray support arm that is moveable between a storage position in which it is parallel to the tray support arm and a use position in which it is perpendicular to the tray support arm.

3 Claims, 5 Drawing Sheets

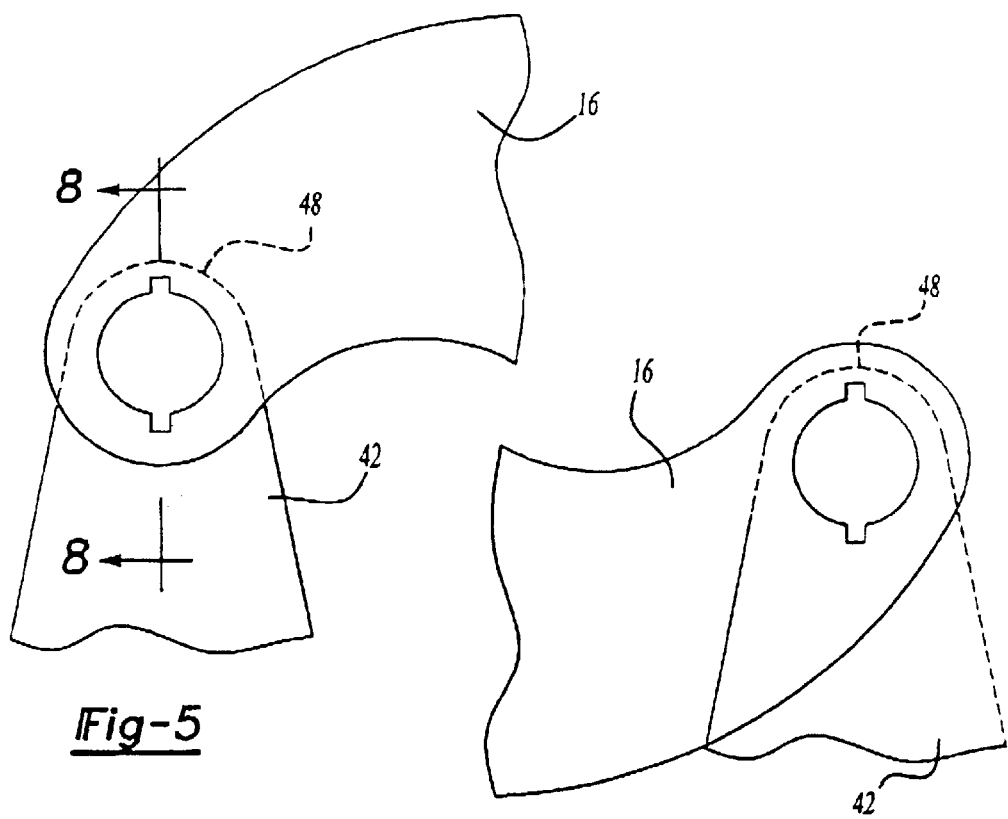
Fig-5
Fig-6
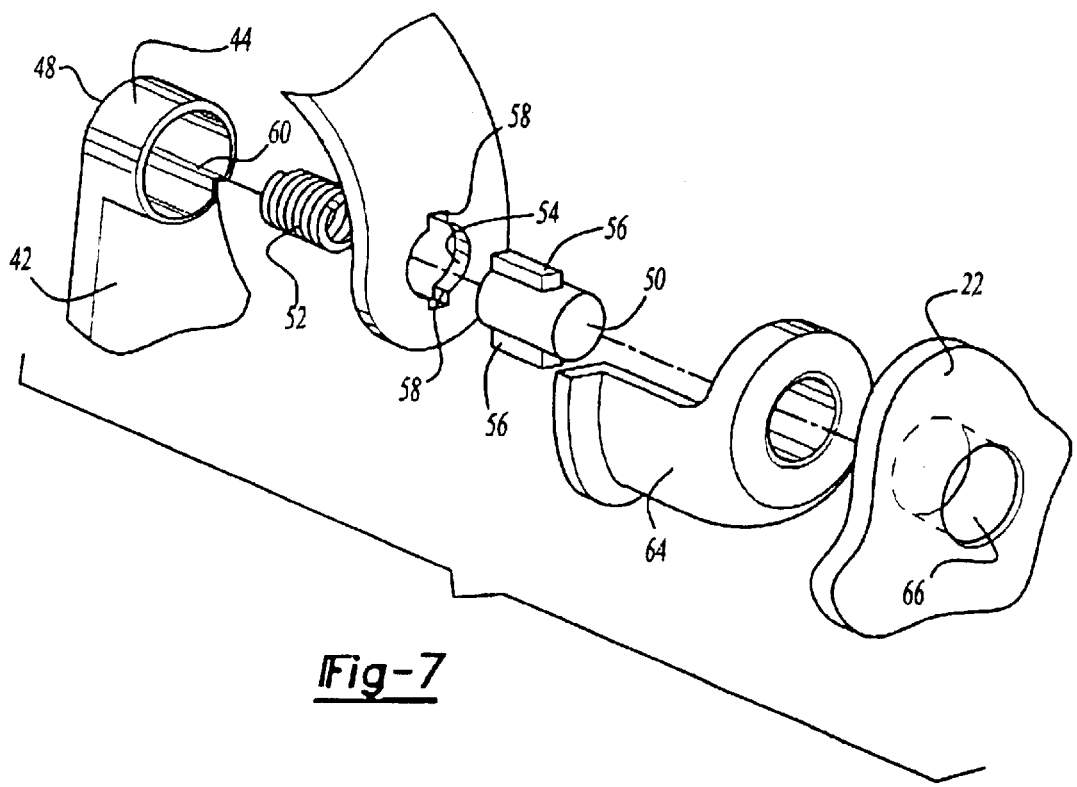
Fig-7

CENTER CONSOLE STORED EXTENSIBLE TRAY TABLE

CROSS-REFERENCE TO RELATED APPLICATION

This application claims the benefit of U.S. provisional application Serial No. 60/121,993; filed Feb. 27, 1999.

TECHNICAL FIELD

The present invention relates to vehicle mounted trays.

BACKGROUND ART

Vehicles including cars, minivans and sport utility vehicles are used for a wide variety of purposes by consumers. On occasion it may be desirable for a tray table to be placed in front of a passenger in a vehicle for eating, writing or working on a laptop computer. Trays or table surfaces would normally be objectionable in a vehicle interior because they tend to crowd or clutter the interior space. Detachable trays tend to clutter a vehicle interior and may not be used because they may end up being stored in the trunk or in a person's garage where they will not be available for use in the car. It would be most desirable to provide a storage compartment that will readily conceal the tray table when not in use.

The space available in vehicle interiors is limited and it is desirable to minimize the size of consoles. Interior cavities of consoles are limited in capacity. It has not generally been thought to be possible to store trays inside a center console of a vehicle.

Center consoles for the rear seat of a vehicle are generally located between the rear seats of the vehicle and do not extend forward of the front edge of the rear seats. If a tray is to be supported by the console insufficient clearance is available between the tray and the body of a person seated in the rear seat in many instances.

These and other problems are addressed by the present invention as summarized below.

DISCLOSURE OF INVENTION

According to the present invention, a tray table for a center console of a vehicle is provided. The center console has at least one lateral wall that is longitudinally shiftable. The lateral wall has an elongated pocket that is open on its upper end. A tray support extends generally upwardly from the lower portion of the lateral wall and terminates at an upper end. A tray is secured by a hinge to the upright end of the tray support. The tray is pivotable between a stowed position and which is parallel and adjacent to the tray support and received within the pocket and a deployed position in which it is supported by the tray support in a substantially horizontal position.

The lateral wall is preferably shiftable along a track. The tray support may include a cup holder that is pivotally secured to the tray support arm. The cup holder is movable between a storage position in which it is flush with the tray support arm and a use position in which it is perpendicular to the tray support arm and extends from the tray support arm in the opposite direction relative to the tray. A pivot lock is provided to connect the lateral wall to the tray support arm. The pivot lock has a button including an elongated shaft that is connected to a spring and a mechanism for locking the tray support arm in either a deployed position or a storage position. The pivot lock button includes keys formed on one end that engage a keyway formed in the tray support arm when the button is not depressed. The keys disengage the keyways when the button is released.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 5 is a fragmentary side view of the tray arm hinge in its open position.

FIG. 6 is a side view of the tray arm hinge in the closed position.

FIG. 7 is an exploded perspective view of a push button locking pawl.

BEST MODE FOR CARRYING OUT THE INVENTION

Figure 1:
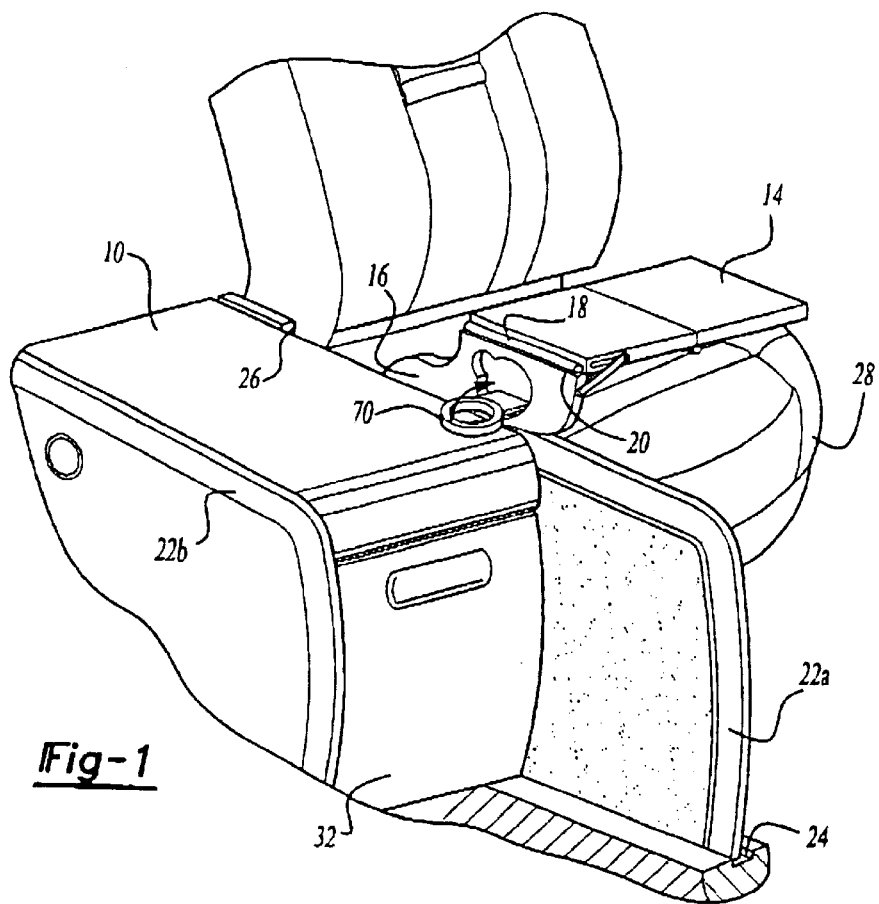
FIG. 1 is a perspective view showing the tray and tray support of the present invention in their deployed position.

Referring now to FIGS. 1–4, a center console 10 of a vehicle (not shown) has a tray 14 supported by a tray support 16. A tray 14 is connected to the tray support 16 by a hinge 18 on the upper end 20 of the tray support 16. The center console 10 includes lateral walls 22a and 22b that may be shifted forward on tracks 24. The lateral walls 22a and 22b each define an elongated pocket 26 in which the tray 14 and tray support 16 may be stowed with the tray support 16 being pivoted upwardly to a position parallel to the lateral walls 22a and 22b.

Track 24 is provided to connect the lateral wall 22a to the center console 10. The lateral walls are adapted to be guided by the track 24 to permit fore and aft adjustment of the location of the tray 14. At least one track 24 is provided but more than one track would be preferred. A vehicle seat 28 is shown adjacent the center console 10. The seat 28 may be either fixed, if a rear seat, or slidable to permit adjustment of the seat location fore and aft. The center console 10 may also include a shiftable or removable storage bin 32 that may be configured to store a wide variety of objects.

Figure 2:
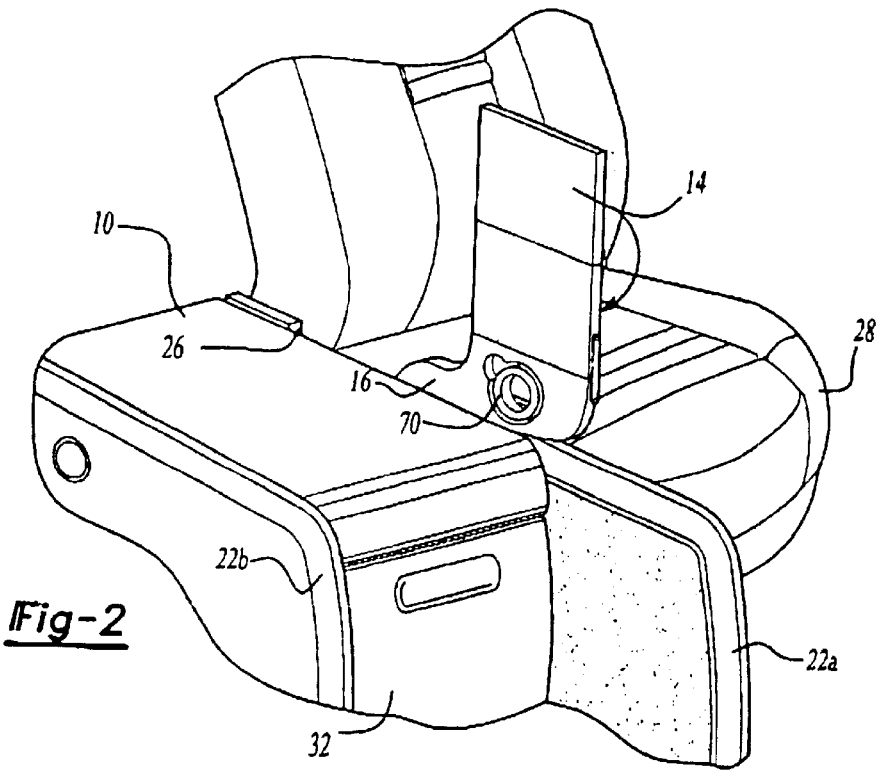
FIG. 2 is a perspective view showing the tray and tray support of the present invention in their partially folded position.
Figure 3:
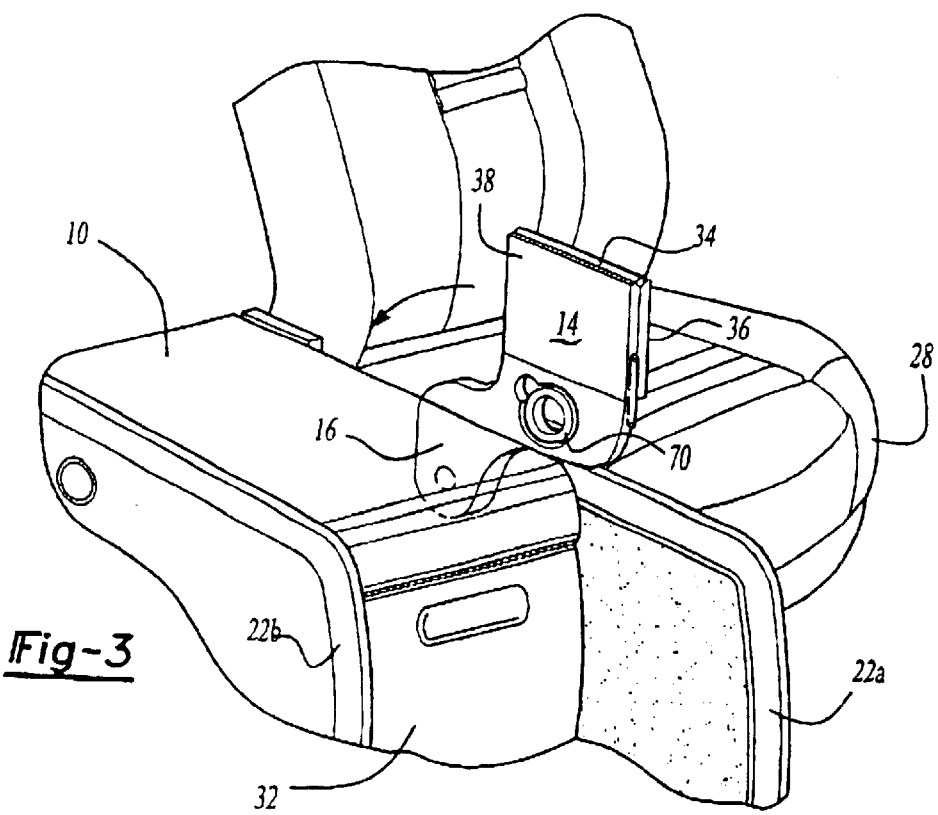
FIG. 3 is a perspective view of the tray and tray support of the present invention in their partially folded position.
Figure 4:
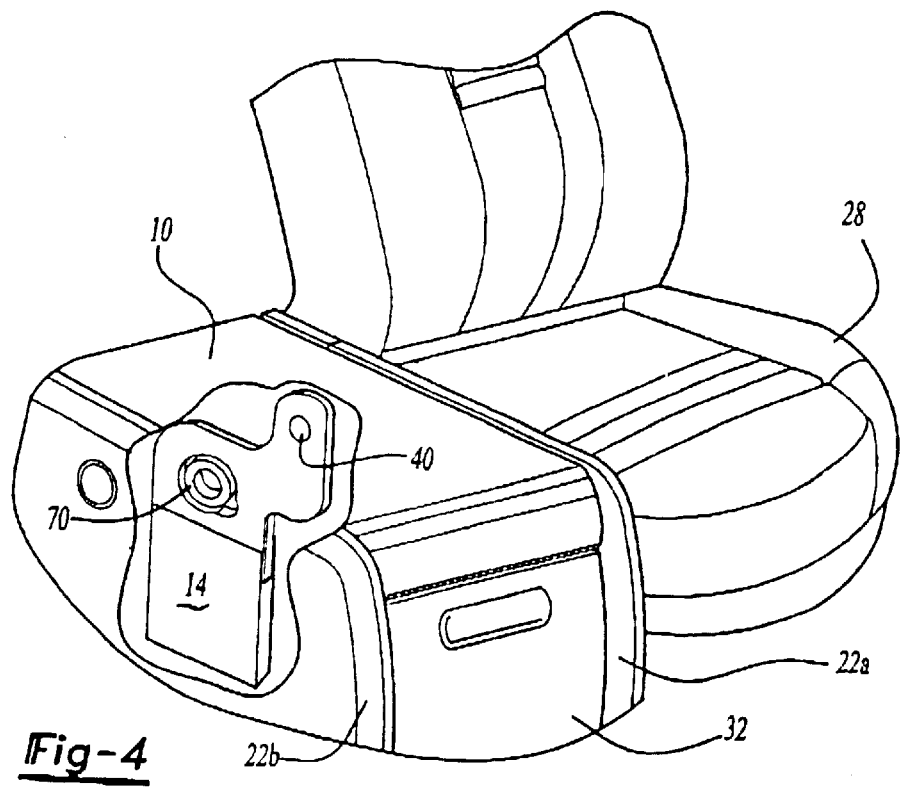
FIG. 4 is a perspective view of the tray and tray support of the present invention in their folded position.

In the sequence of views shown in FIGS. 1–4, the tray table is folded from its deployed position to a folded position. In FIG. 1, the tray 14 is held in a horizontal orientation by the tray support 16. The tray support 16 is rotated to a position in which it is in the same plane as the lateral wall 22a. In FIG. 2, the tray is shown pivoted to a vertical position in the same plane as the tray support 16. In FIG. 3, the tray 14 is folded in half on a hinge 34 that connects right and left portions 36 and 38 of the tray 14. In FIG. 4, the tray support is pivoted into the pocket 26 and is stored in the lateral wall 22a. The tray support 16 pivots on a locking pawl 40 as will be fully described below with reference to FIGS. 5–9.

Referring now to FIGS. 5–9 the tray support 16 is supported within the lateral wall 22a by a reinforcement plate 42 having a boss 44 at its upper end 48. A push button 50 and spring 52 are received at least partially within the boss 44. The tray support has an opening 54 through which the push button 50 extends. The tray support is rotatable 180 degrees from the deployed position shown in FIG. 5 to the stored position in FIG. 6. The push button 50 has two radially extending keys 56 that are received in key ways 58 formed in the tray support 16 when the tray support is in either the deployed position or the stored position. A V-shaped ridge 60 is formed in the boss 44 to limit rotation of the push button 50. A retainer 64 is secured to reinforcing plate 42 to retain the push button 50. An opening 66 is formed throught the lateral wall 22a to provide access to the push button 50.

Figure 8:
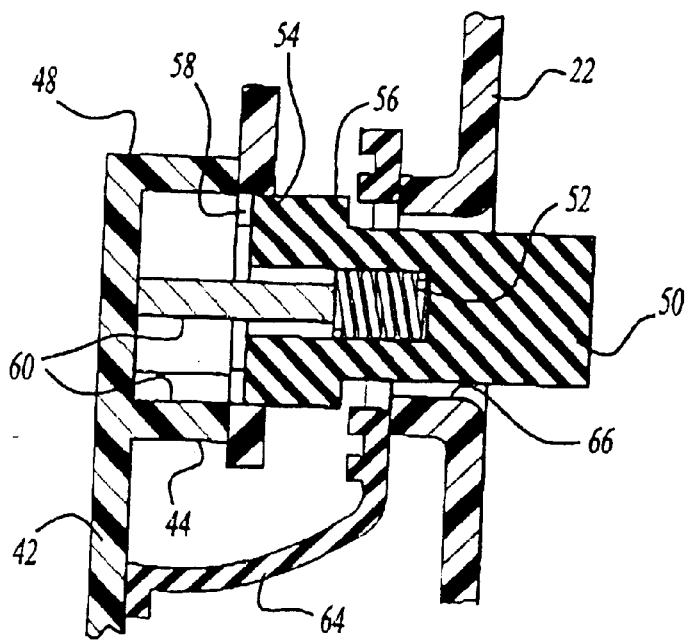
FIG. 8 is a cross-sectional view taken along the line 8—8 in FIG. 5.
Figure 9:
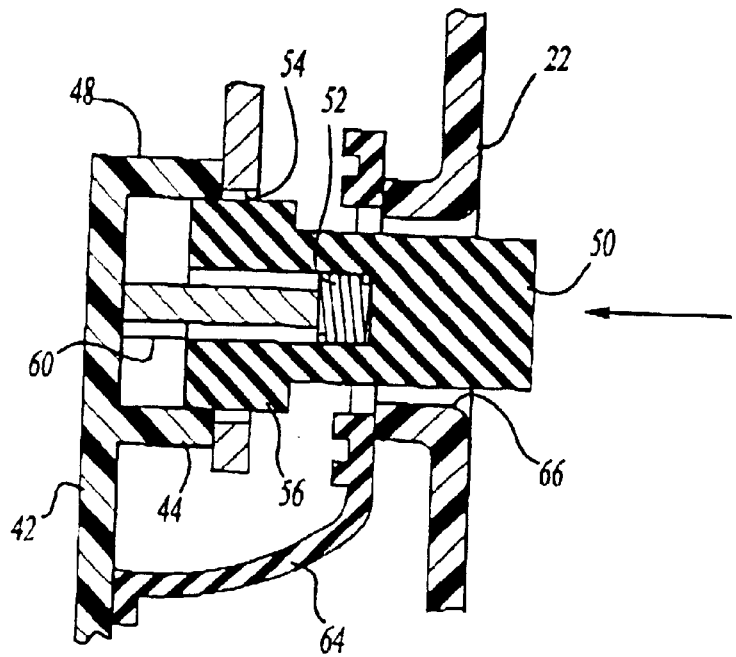
FIG. 9 is a cross-sectional view corresponding to the cross-sectional view in FIG. 8 showing the push button depressed.
Figure 10:
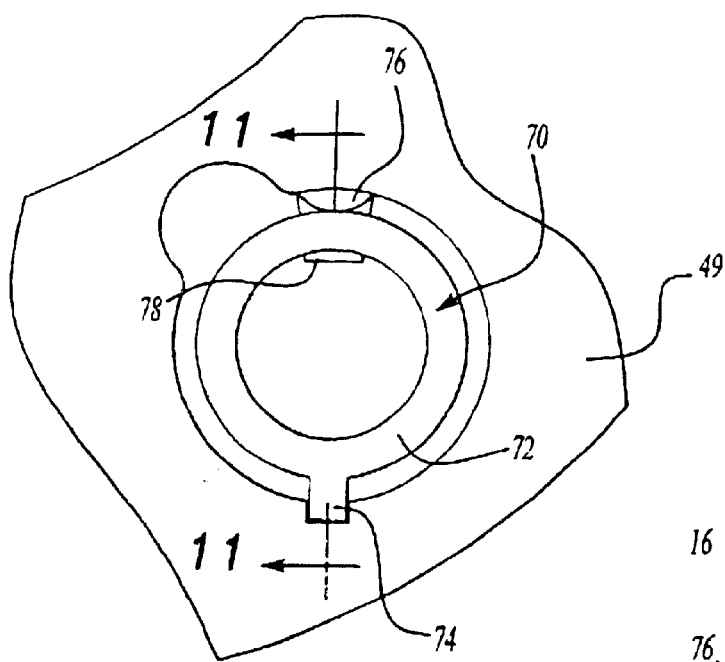
FIG. 10 is a side elevation view of the cup holder in the tray arm.
Figure 11:
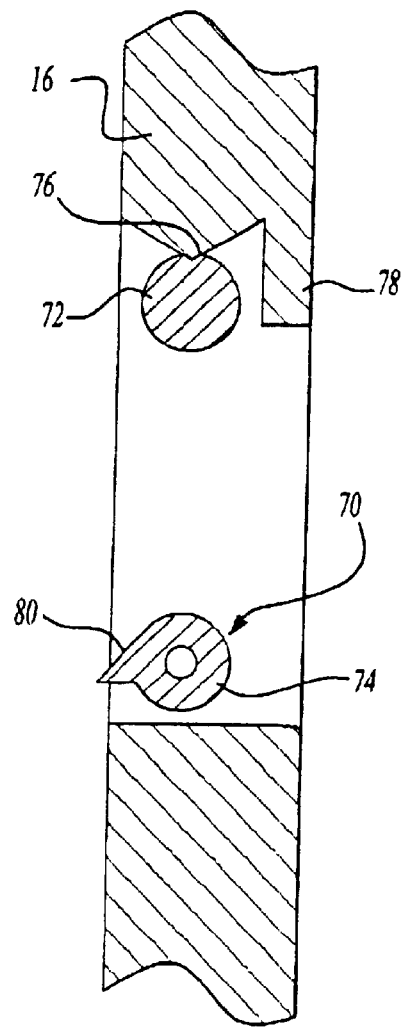
FIG. 11 is a cross-sectional view taken along the line 11—11 in FIG. 10.

Referring to FIGS. 8 & 9, the operation of the push button 50 to release and lock the tray support is illustrated. In FIG. 8 the spring 52 biases the push button 50 to hold it in its extended position in which the keys 56 are in the key ways 58 formed in the tray support 16. In FIG. 9 the push button 50 is shown depressed against the force of the spring 52 and the keys 56 are disengaged from the key ways 58 thereby allowing the tray support to rotate on the push button 50 between the deployed and storage positions.

Referring now to FIGS. 1–4, 10 and 11, a cup holder 70 that is supported by the tray arm 16 is shown. The cup holder includes a ring 72 that is connected by a hinge 74 to the tray support 16. A detent 76 is provided on the tray arm 16 that engages the ring 72 at a point generally opposite the hinge 74 for holding the cup holder 70 in its stored position. A stop 78 is provided on the detent 76 that stops the cup holder 70 from moving beyond the vertical position when it is shifted to the stored position. A tab 80 is provided on the hinge 74 to stop the cup holder 70 when it reaches the horizontal position.

The preceding description is of a preferred embodiment of the invention and should be read as an example and not in a limiting sense.

What is claimed is:

1. A tray table and a center console, in combination, for a vehicle comprising:

the center console having at least one lateral wall that is shiftable longitudinally along a track, the center console having an elongated pocket open on an upper end;

a tray support arm pivotally connected to the lateral wall, said tray support arm being pivotal between a stowed position in which it is disposed within the pocket and an extended position;

the tray table is secured by a hinge to an upper end of the tray support arm when the tray support arm is in its extended position, said tray table being pivotable between a stowed position in which is parallel and adjacent to the tray support arm and received within the pocket and a deployed position in which the tray table is supported by the tray support arm in a substantially horizontal position; and a cup holder pivotally secured to the tray support arm that is moveable between a storage position in which the cup holder is flush with the tray support arm and a use position in which the cup holder is perpendicular to the tray support arm and extends from the tray support arm in the opposite direction from the tray.

2. A tray table and a center console, in combination, for a vehicle comprising:

the center console having at least one lateral wall that is shiftable longitudinally, the center console having an elongated pocket open on an upper end;

a tray support arm extending generally upwardly from the lateral wall of the center console and terminating at an upper end;

a pivot lock connecting the lateral wall and tray support arm together, the pivot lock having a button including an elongated shaft that is connected to a spring and mechanism for locking the tray support arm in either a deployed position or a storage position; and a tray secured by a hinge to the upper end of the tray support arm, said tray being pivotable between a stowed position in which it is parallel and adjacent to the tray support and received within the pocket and a deployed position in which it is supported by the tray support arm in a substantially horizontal position.

3. The tray table and center console combination of claim 2 wherein the elongated shaft of the pivot lock button has keys formed on one end that engage a key way formed in the tray support arm when the button is not depressed and wherein the keys disengage the key ways when the button is released.

* * * * *